(12) United States Patent
Tanemoto et al.

(10) Patent No.: US 6,526,740 B1
(45) Date of Patent: Mar. 4, 2003

(54) CHAIN

(75) Inventors: Atsuhiro Tanemoto, Unoke-machi (JP); Tadasu Sawamori, Kanazawa (JP)

(73) Assignee: Oriental Chain Mfg. Co., Ltd., Matto (JP)

( * ) Notice: Subject to any disclaimer, the term of this patent is extended or adjusted under 35 U.S.C. 154(b) by 0 days.

(21) Appl. No.: 09/531,229

(22) Filed: Mar. 20, 2000

(30) Foreign Application Priority Data

Apr. 22, 1999 (JP) .......................................... 11-115553

(51) Int. Cl.[7] .......................... F16G 13/10; F16G 13/14
(52) U.S. Cl. ........................... 59/5; 198/852; 474/210; 474/231
(58) Field of Search ..................... 59/4, 5; 198/852; 474/210, 231

(56) References Cited

U.S. PATENT DOCUMENTS

| | | | | | |
|---|---|---|---|---|---|
| 1,105,510 A | * | 7/1914 | Irvin | ........................ | 474/210 |
| 1,209,765 A | * | 12/1916 | Schenk | ........................ | 474/210 |
| 1,453,702 A | * | 5/1923 | Carstens | ........................ | 474/210 |
| 1,965,285 A | * | 7/1934 | Gilstad | ........................ | 474/210 |
| 2,526,563 A | * | 10/1950 | Keen | ........................ | 198/852 |
| 2,891,501 A | | 6/1959 | Rather | | |

FOREIGN PATENT DOCUMENTS

| | | |
|---|---|---|
| JP | 38-24929 U | 11/1963 |
| JP | 51-10291 U | 3/1976 |

OTHER PUBLICATIONS

Oriental Chain Manufacturing Co., Ltd., "Power Transmission Products", Dec. 1994, pp. 103–104.

* cited by examiner

Primary Examiner—David Jones
(74) Attorney, Agent, or Firm—Smith Patent Office

(57) ABSTRACT

A chain (CA) comprises a plurality of link units (10), each including a pair of link plates (11) and a connection member (12) placed between the link plates (11) at one end of each link unit (10). The link plates (11) of one link unit (10) are connected end to end with the link plates (11) of another link unit (10) by a connecting pin (13) in such a way that the link units (10) are angularly displaced by 90 degrees from one link unit (10) to another as viewed along an extending direction of the chain (CA), whereby the successive link units (10) of the chain (CA) can be alternately bent in two different directions. The chain (CA) thus constructed can be bent and run in desired directions.

23 Claims, 10 Drawing Sheets

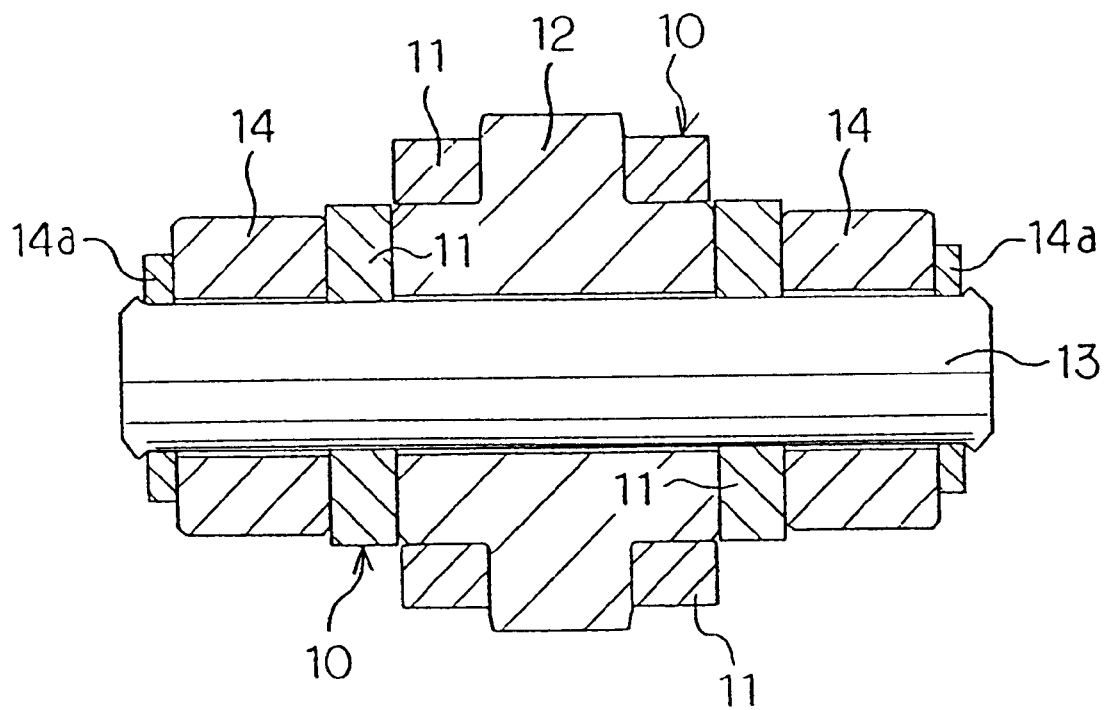

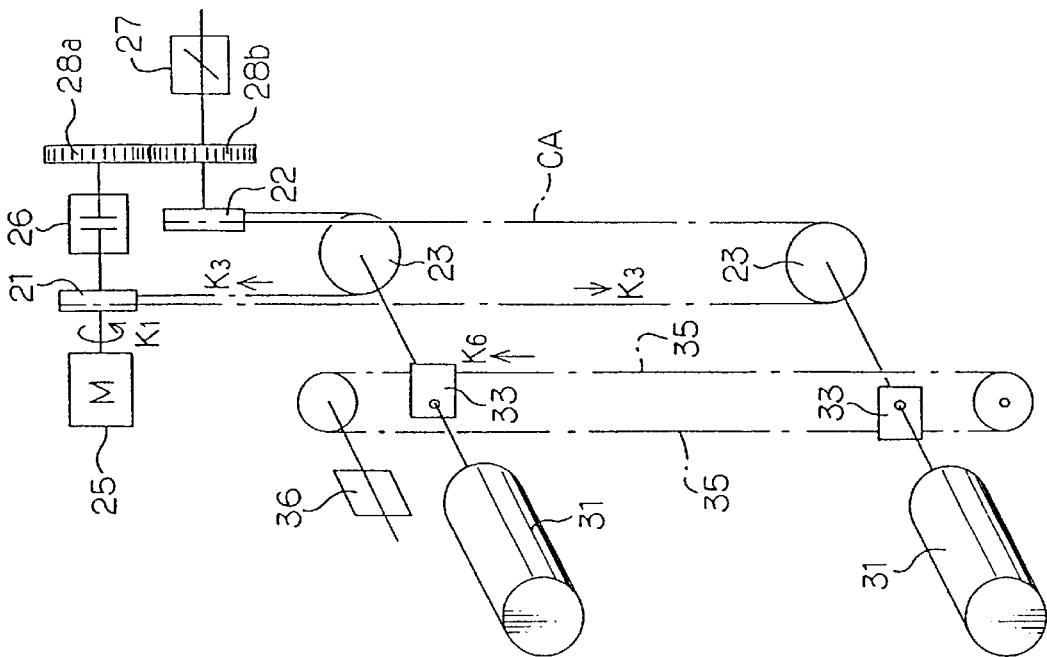
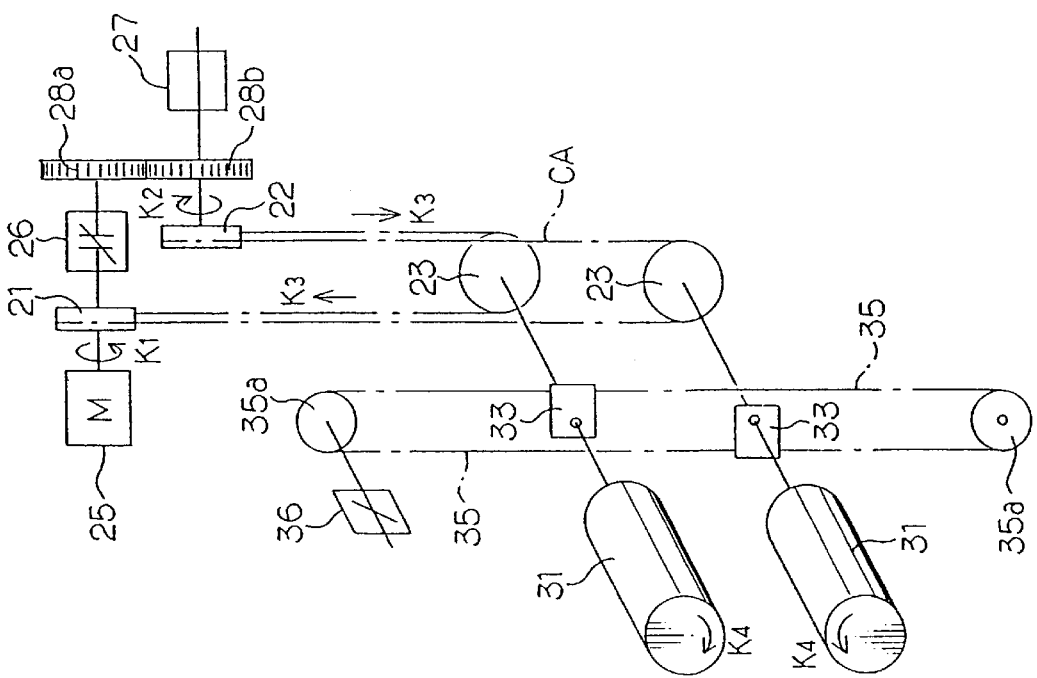

CHAIN

BACKGROUND OF THE INVENTION

1. Field of the Invention

This invention relates to a chain whose successive link units have two degrees of freedom so that the chain can be pivoted and run in desired directions.

2. Discussion of the Related Art

A roller chain is often used for transmitting a rotational driving force. The roller chain includes inner and outer link plates which are joined one after another by connecting pins. When mounted on a driving sprocket and a driven sprocket which are placed in a common plane, the roller chain can transmit a rotational driving force from the driving sprocket to the driven sprocket.

Although, while such a conventional roller chain is pivotable, its pivoting action is limited to a single plane. Therefore, it has been required that the driving sprocket and the driven sprocket be placed in the same plane, and it has been impossible to place them in other desired relative positions.

SUMMARY OF THE INVENTION

The invention provides a solution to the aforementioned problem with the conventional chain. Specifically, it is an object of the invention to provide a chain whose successive link units are connected in such a way that the axes of motion of their joints are successively displaced by 90 degrees from one link unit to another, making it possible to place a driving sprocket and a driven sprocket in other desired relative positions.

According to the present invention, a chain comprises a plurality of link units, each including a pair of link plates and a connection member placed between the link plates at one end of each link unit, wherein the link plates of one link unit are connected end to end with the link plates of another link unit by a connecting pin in such a way that the link units are angularly displaced by 90 degrees from one link unit to another as viewed along the chain, whereby the successive link units of the chain can be alternately moved in two different directions.

These and other objects, features and advantages of the present invention will become more apparent upon reading of the following detailed description along with the drawings.

BRIEF DESCRIPTION OF THE DRAWINGS

FIGS. 4A and 4B are explanatory diagrams showing how the chain is mounted around the sprocket, in which FIG. 4B is a cross-sectional view taken along a line 4B—4B of FIG. 4A;

FIG. 6 is an enlarged cross-sectional view taken along a line 6—6 of FIG. 5;

FIGS. 7A and 7B are explanatory diagrams showing another variation of the embodiment of FIG. 1, in which FIG. 7B is a partial cross-sectional and partial side view taken along line 7B—7B of FIG. 7A;

FIGS. 8A and 8B are explanatory diagrams showing another variation of the embodiment of FIG. 1, in which FIG. 8B is an enlarged side view including a partial cross-sectional view as seen in the direction of arrow B of FIG. 8A;

FIGS. 10A and 10B are explanatory schematic diagrams showing how the drive mechanism of FIG. 9 operates.

DETAILED DESCRIPTION OF THE PREFERRED EMBODIMENTS

The invention will now be described with reference to its preferred embodiments which are illustrated in the accompanying drawings.

Figure 1:
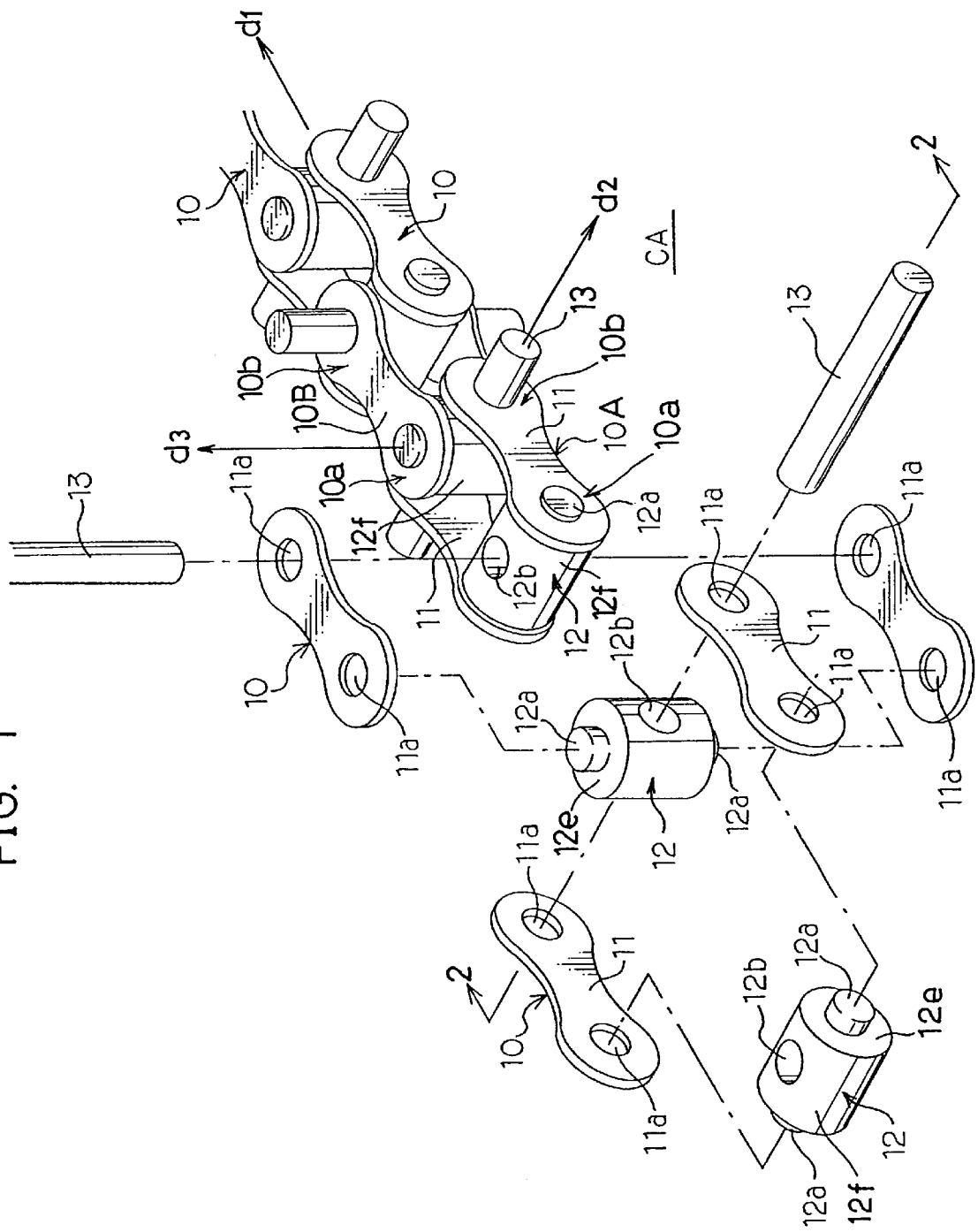
FIG. 1 is an exploded perspective view of a portion of a chain according to a preferred embodiment of the invention.
Figure 2:
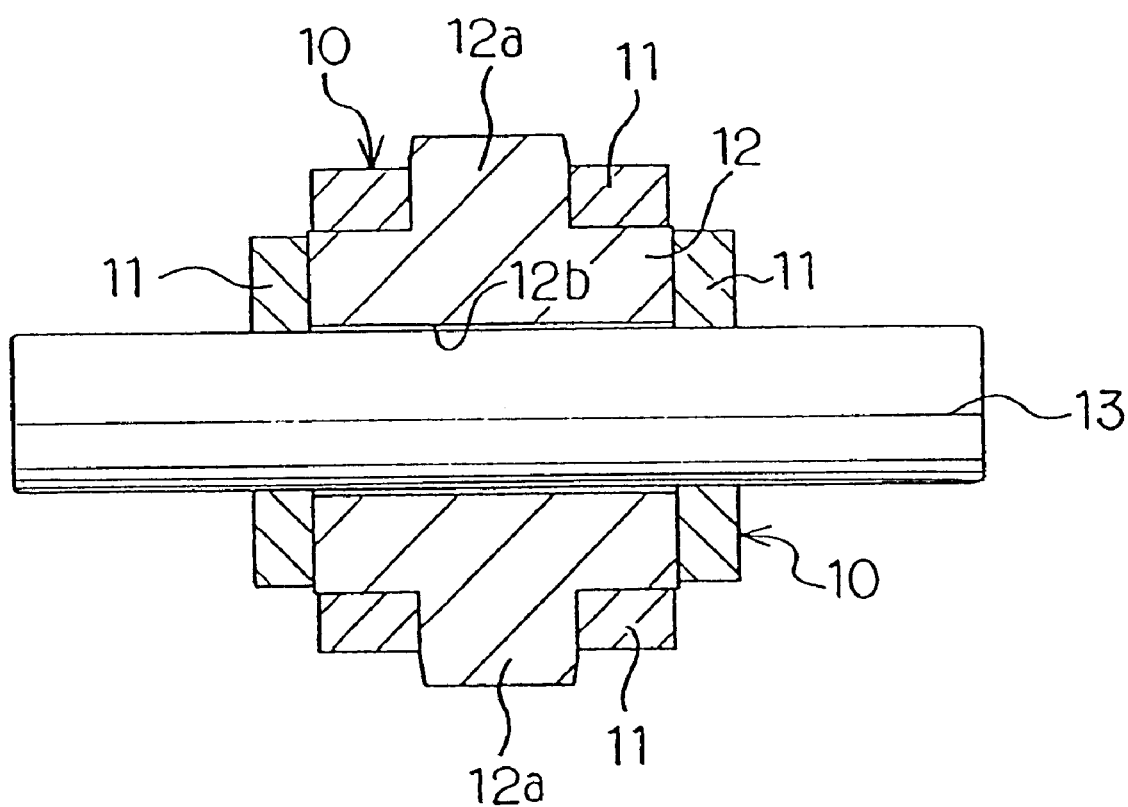
FIG. 2 is an enlarged cross-sectional view taken along a line 2—2 of FIG. 1.

Referring to FIGS. 1 and 2, a chain CA according to the first embodiment of the invention has a plurality of link units 10 which are connected one after another.

Each link unit 10 includes a pair of link plates 11 and a connecting stud 12 (also referred to as a connection member) which are assembled together. Pin-fitting holes 11a are formed in both terminal portions of each link plate 11 as illustrated. The connecting stud 12 is formed into a generally cylindrical shape having a main cylindrical portion 12f and projections 12a extending from both end surfaces 12e of the cylindrical portion 12f. Further, a pin-fitting hole 12b is formed in a mid-length position of the cylindrical portion 12f of the connecting stud 12 in a direction perpendicular to its longitudinal axis d3. The projections 12a of the connecting stud 12 fit into the pin-fitting holes 11a at one end of a link unit 10 while a connecting pin 13 fits in the pin-fitting holes 11a, 12b at the other end of the link unit 10. When the projections 12a of the connecting stud 12 are inserted into the respective pin-fitting holes 11a in the link plates 11 at one end of the link unit 10 and flattened by pressing or hammering from outside, the connecting stud 12 is assembled with the link plates 11. The connecting stud 12 is positioned such that its pin-fitting hole 12b is oriented at right angles to the direction of the longitudinal axis of the link plates 11.

The link unit shown in the middle in FIG. 1 is hereinafter designated by the numeral 10A and the link unit on its right in FIG. 1 is hereinafter designated by the numeral 10B for the convenience of explanation. The pin-fitting holes 11a in the link plates 11 at a right end 10b of the link unit 10A are aligned with the pin-fitting hole 12b in the connecting stud 12 at a left end 10a of the right adjacent link unit 10B and the connecting pin 13 is inserted into the pin-fitting holes 11a, 12b. When the two link units 10A, 10B have been joined together in this manner, the connecting pin 13 at the right end 10b of the link unit 10A intersects the connecting stud 12 at the left end 10a of the adjacent link unit 10B at right angles, as if turned by 90 degrees about a longitudinal axis d1 (also referred to as "a chain extension directions") of the chain CA. While the connecting pin 13 thus inserted is rotatable in the pin-fitting hole 12b in the connecting stud 12, it, however, can not rotate relative to the pin-fitting holes 11a in the two link plates 11. Both terminal portions of the connecting pin 13 protrude to the outside of the link plates 11. The link units 10 are joined by means of the connecting studs 12 and the connecting pins 13 as described above with an angular displacement of 90 degrees from one link unit 10 to another as viewed along the longitudinal axis d1 of the chain CA. The successive link units 10 of the chain CA thus constructed have two degrees of freedom, or can be bent in two perpendicular directions.

In the above-described construction of the chain CA, a longitudinal axis d2 of the connecting pin 13 at the right end 10b of the link unit 10A is oriented at right angles to the longitudinal axis d3 of the connecting stud 12 at the left end 10a of the adjacent link unit 10B as illustrated. The chain CA is used in combination with a bobbin-shaped sprocket 20 shown in FIGS. 3 and 4A–4B. The sprocket 20 is constructed essentially of a boss 20a and a pair of large disklike flanges 20b which are formed on the boss 20a. FIGS. 4A–4B illustrate how the chain CA is mounted on the sprocket 20, in which FIG. 4B is a cross-sectional view taken along a line 4B—4B of FIG. 4A. There is formed a shaft hole 20a1 in the boss 20a. A keyway 20a2 is machined in this shaft hole 20a1 and a plurality of screw holes 20a3 opening into the shaft hole 20a1 are formed in the boss 20a for fitting unillustrated set screws. There are a plurality of engagement recesses 20b1 on the outer periphery of each flange 20b at intervals corresponding to the distance between the connecting pins 13 oriented in the same direction.

The chain CA of this embodiment can be mounted on the sprocket 20 with both terminal portions of each connecting pin 13, which is oriented parallel to the axial direction of the sprocket 20, hooked in the relevant engagement recesses 20b1 in the flanges 20b. When mounted on the sprocket 20 in this way, the chain CA wraps the sprocket 20 with every other link unit 10 bent along the outer periphery of the sprocket 20. Also when the chain CA is mounted on the sprocket 20, one end of each connecting pin 13 which is oriented in a radial direction of the sprocket 20 is accommodated in a groove 20c between the two flanges 20b as shown in FIG. 4B.

VARIATIONS OF THE EMBODIMENT

Figure 5:
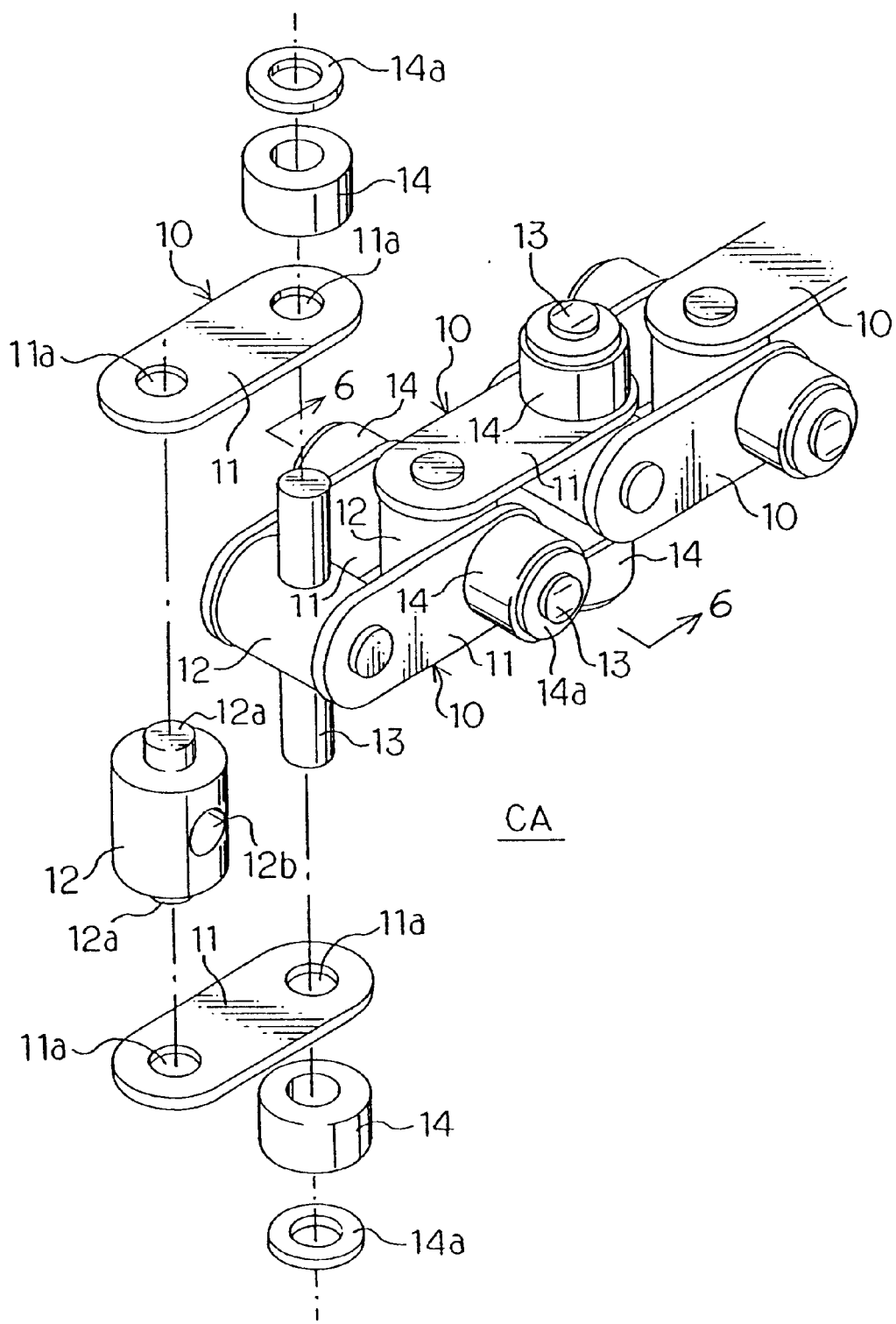
FIG. 5 is an exploded perspective view of one variation of the embodiment of FIG. 1.

In one variation of the foregoing embodiment, engagement rollers 14 are mounted on both terminal portions of each connecting pin 13 which protrude outward through link plates 11 on both sides of each link unit 10 of a chain CA, as shown in FIGS. 5 and 6. A stopper ring 14a is mounted on both terminal portions of the connecting pin 13, outside the engagement rollers 14, and the extreme ends of the connecting pin 13 are flattened by pressing or hammering from outside to prevent the engagement rollers 14 from coming off the connecting pin 13. The engagement rollers 14 are rotatably mounted on the individual connecting pins 13 in this fashion. The chain CA of this variation of the embodiment can be wrapped on the sprocket 20 shown in FIG. 3 so that the engagement rollers 14 rest in the engagement recesses 20b1 in the sprocket 20.

Figure 7A:
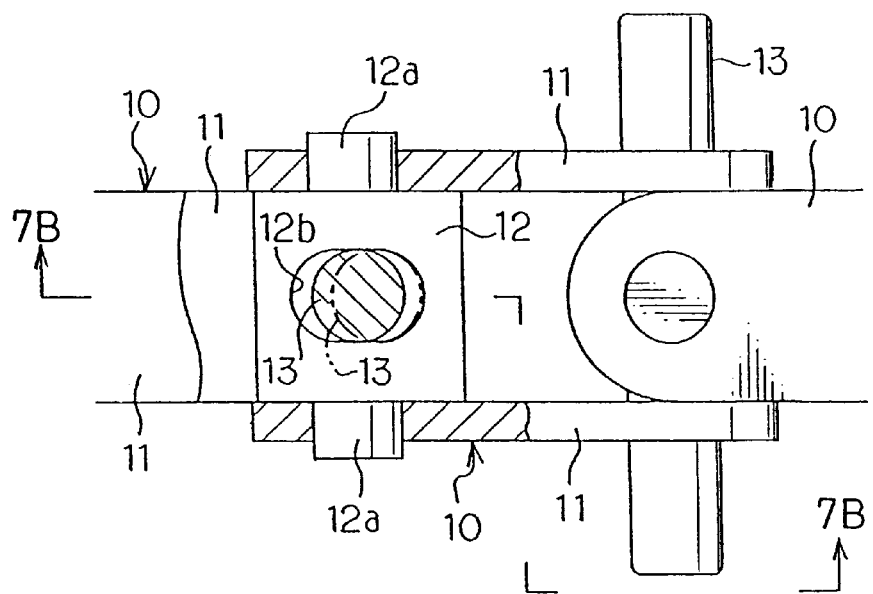
Figure 7B:
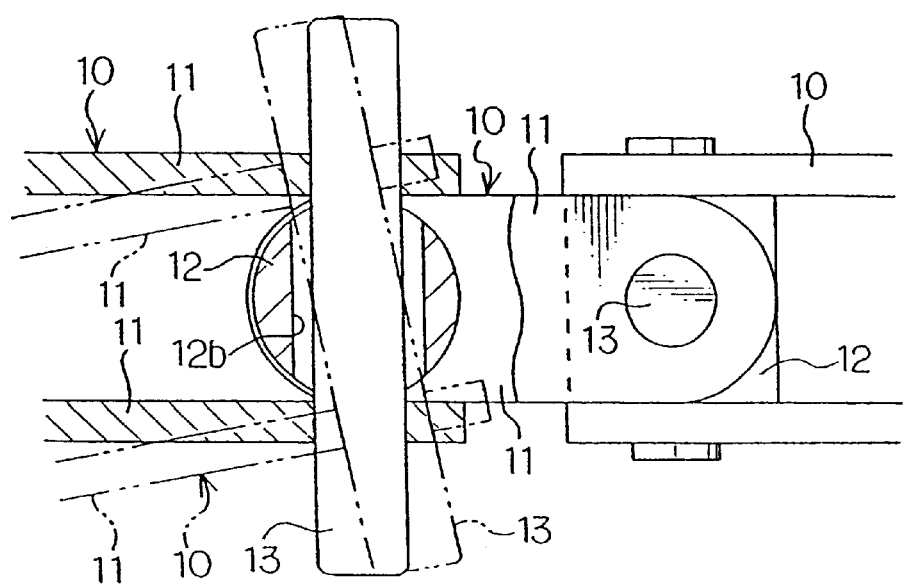

In another variation of the embodiment, a pin-fitting hole 12b formed in each connecting stud 12 has a generally elliptical cross section elongated in the direction of the longitudinal axis of each link plate 11 as shown in FIGS. 7A and 7B, in which FIG. 7B is a partial side view and partial cross-sectional view taken along a line 7B—7B of FIG. 7A. This construction allow each connecting pin 13 to tilt, or swing, within the pin-fitting hole 12b in a plane interesting the connecting stud 12 at right angles to its longitudinal axis d3 as shown by alternate long and two short dashed lines in FIG. 7B. Therefore, each link unit 10 can be slightly bent relative to its adjacent link unit 10 about the longitudinal axis d2 of the connecting stud 12.

Figure 8A:
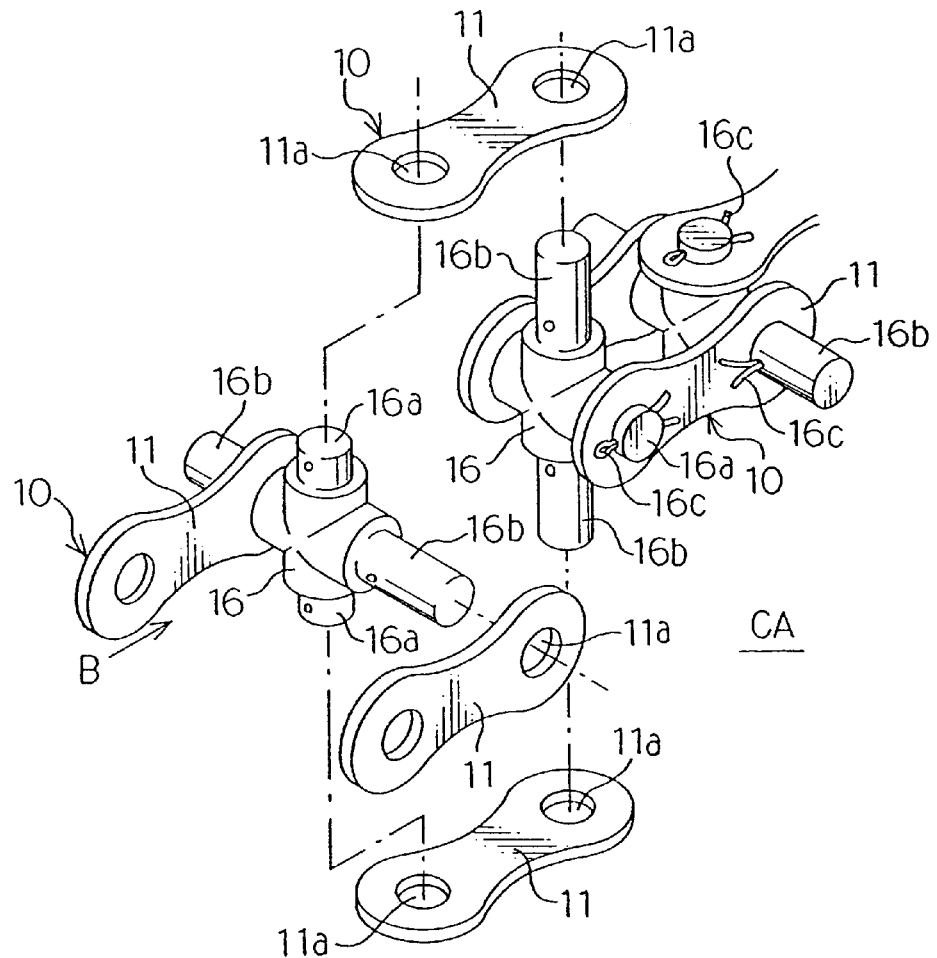
Figure 8B:
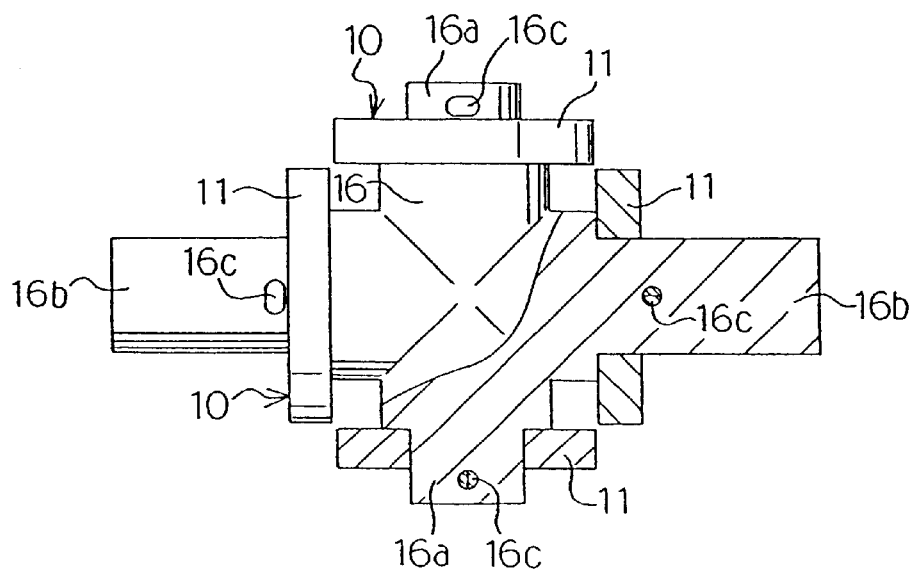

In still another variation of the embodiment, the connecting pin 13 and the connecting stud 12 of the foregoing embodiment and its variations may be combined into a one-piece formed connecting member 16 as shown in FIGS. 8A and 8B, in which FIG. 8B is an enlarged partial side view and partial cross-sectional view as seen in the direction of arrow B of FIG. 8A.

The connection member 16 of this variation is formed into a generally cruciform shape having a pair of projections 16a which correspond to the projections 12a of each connecting stud 12 and a pair of pinlike portions 16b which correspond to both terminal portions of each connecting pin 13. Although each link plate 11 is secured by a pair of cotter pins 16c in the example shown in FIGS. 8A and 8B, the cotter pins 16c may be replaced by retaining rings, or extreme ends of the projections 16a and the pinlike portions 16b may be flattened from outside the link plates 11.

PRACTICAL APPLICATION

Figure 9:
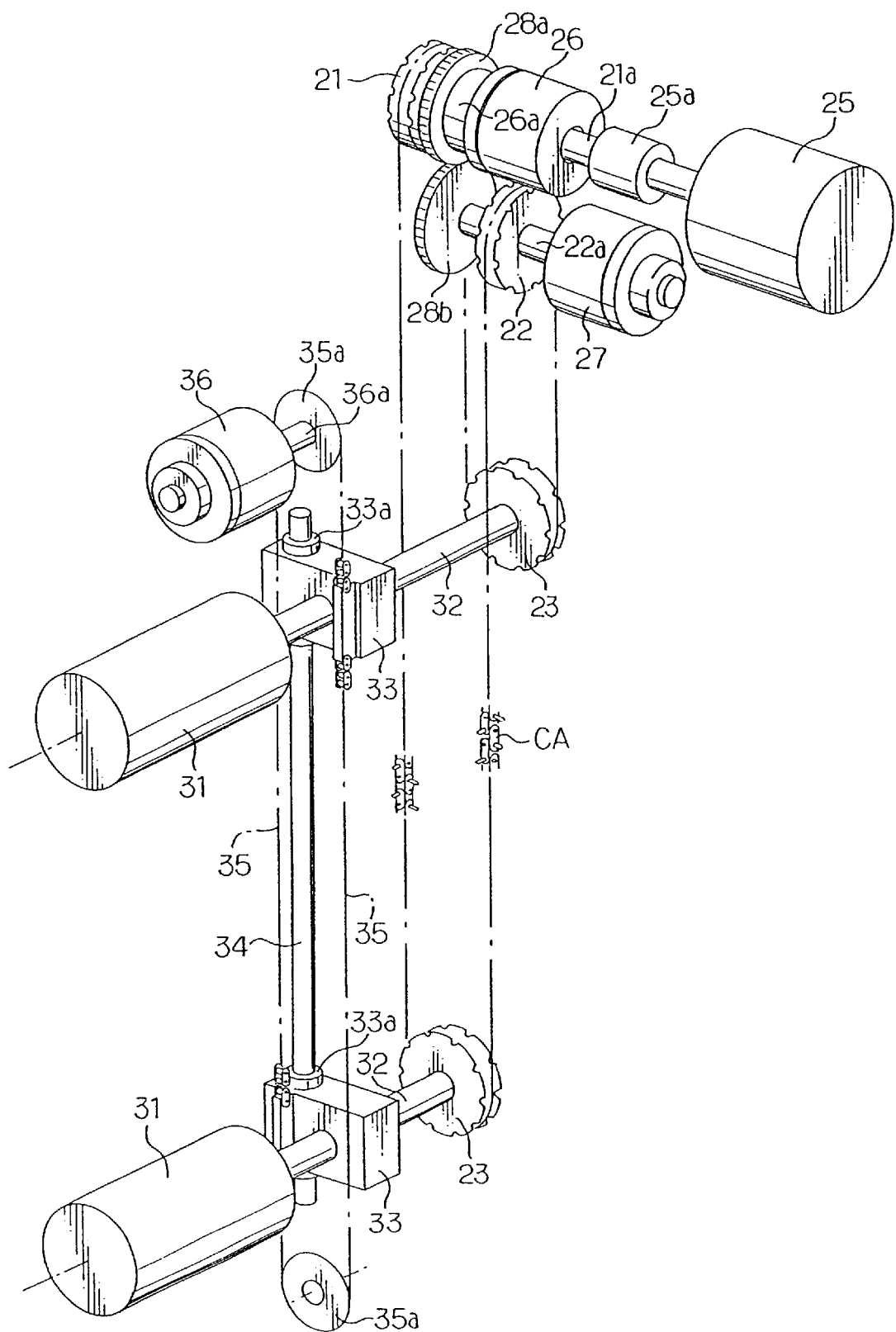
FIG. 9 is a perspective view of a drive mechanism showing how the chains of the invention are used in a practical application.

Any of the chains CA shown in FIGS. 1–3, 4A–4B, 5, 6, 7A–7B and 8A–8B can be used to construct a drive mechanism including a pair of rotary members 31 in combination with a driving sprocket 21, a secondary sprocket 22 and two driven sprockets 23 as shown in FIG. 9, for example.

In this drive mechanism, the upper and lower rotary members 31 are rotatably supported by respective bearing blocks 33. Although a shaft 32 of each rotary member 31 is supported by two bearing blocks 33, only one is shown in FIG. 9. A slider 33a through which a guide rod 34, common for the upper and lower bearing blocks 33, passes is assembled in each bearing block 33, and an endless chain 35 for adjusting the distance between the upper and lower shafts 32 is wrapped on upper and lower sprockets 35a. The upper sprocket 35a is connected to a sub-brake 36 by a shaft 36a as illustrated.

Figure 3:
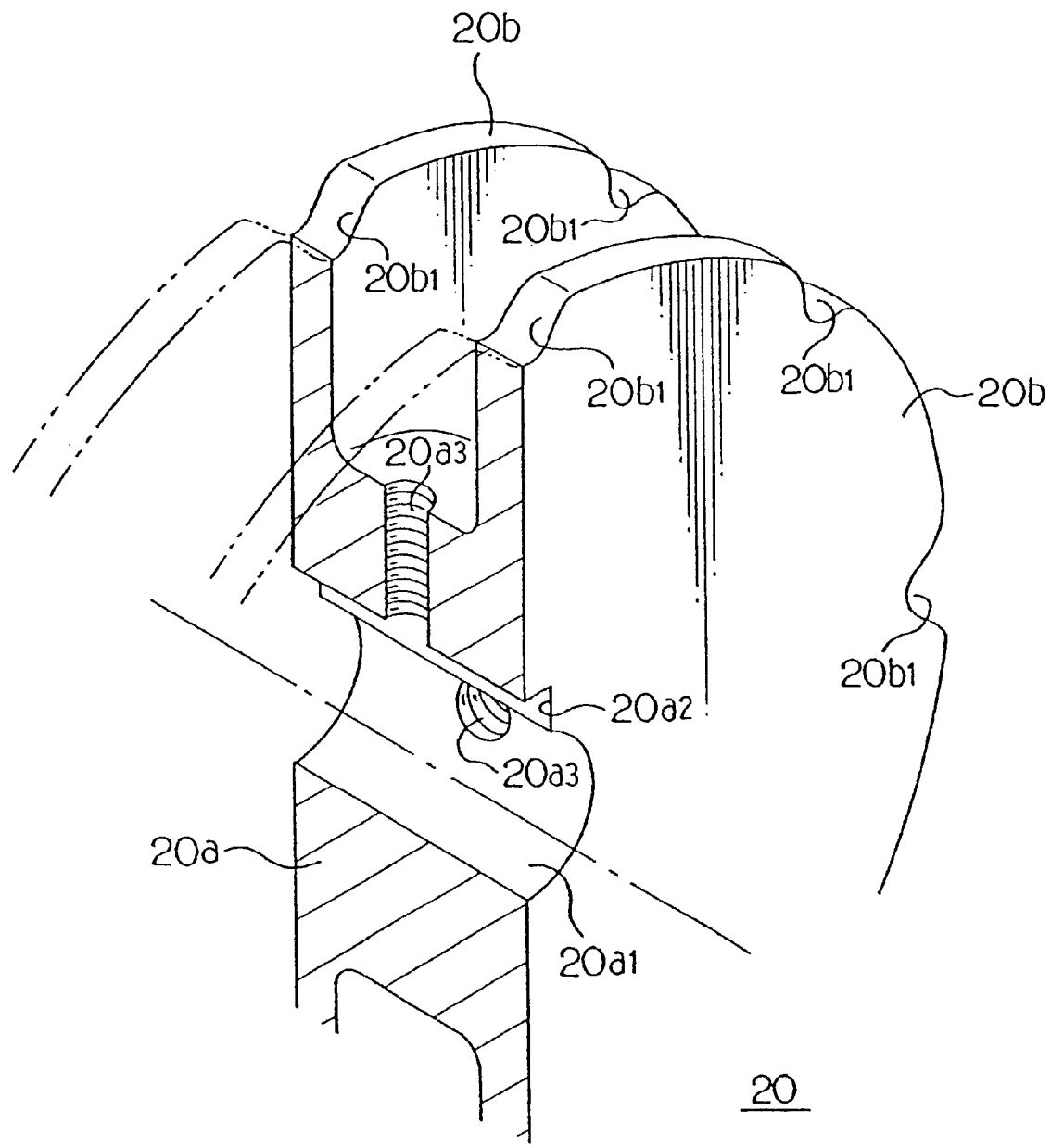
FIG. 3 is a partially cutaway perspective view of a sprocket.
Figure 4A:
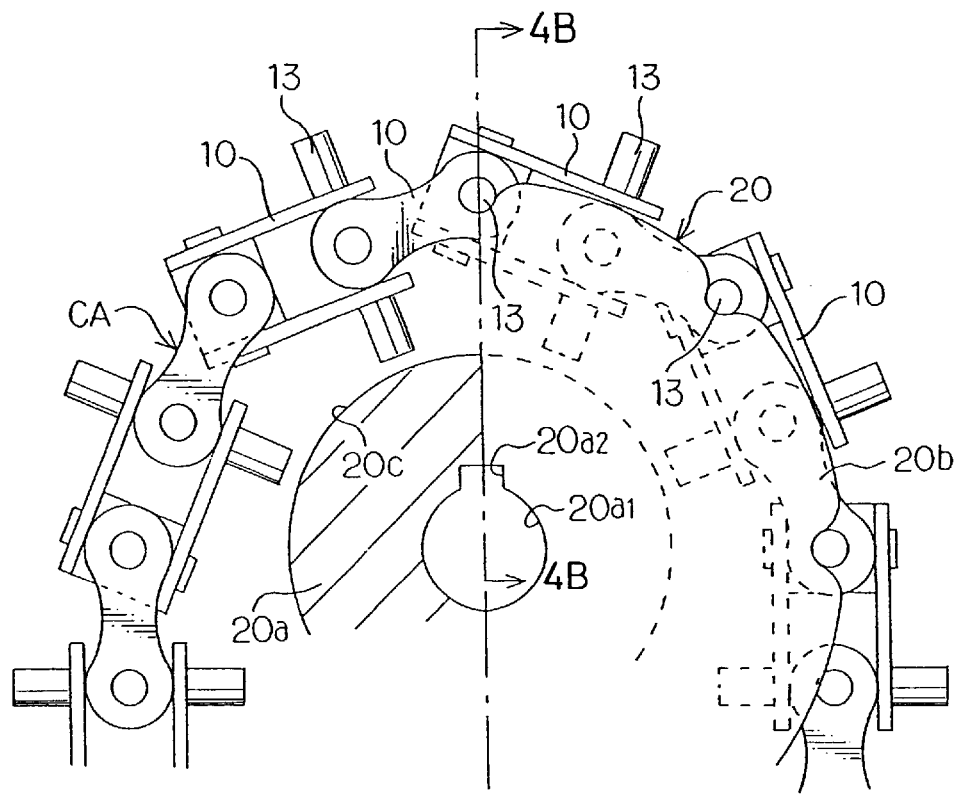
Figure 4B:
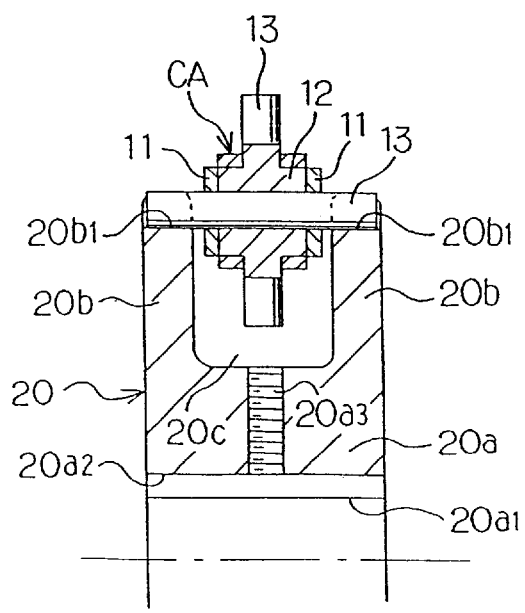

The driving sprocket 21, the secondary sprocket 22 and the driven sprockets 23 each have the same construction as the sprocket 20 shown in FIGS. 3 and 4A–4B. The driving sprocket 21 is connected to a motor 25 by a shaft 21a and a coupling 25a. A clutch 26 is coaxially mounted on the shaft 21a and a gear 28a is mounted on an output shaft 26a of the clutch 26. The secondary sprocket 22 is connected to a brake 27 by a shaft 22a and a gear 28b which meshes with the gear 28a mounted on the shaft 22a. The driven sprockets 23 are individually mounted on ends of the shafts 32 of the upper and lower rotary members 31.

In the drive mechanism thus constructed, the shaft 21a of the driving sprocket 21 and the shaft 22a of the secondary sprocket 22 are oriented at right angles to the shafts 32 of the respective rotary members 31, and the secondary sprocket 22 and the driving sprocket 21 are horizontally displaced from each other in their axial direction by an amount corresponding to the diameter of the two driven sprockets 23. Also, the two driven sprockets 23 are horizontally displaced from each other in their axial direction by an amount corresponding to the diameter of the secondary sprocket 22. An endless driving chain CA is wrapped on the driving sprocket 21, the secondary sprocket 22 and the two driven sprockets 23 as if bent in reverse directions at extreme ends by the driven sprockets 23.

When the upper and lower rotary members 31 are to be turned in their forward directions, the sub-brake 36 is actuated to restrain the chain 35, the clutch 26 is actuated to lock the gear 28a tight on the shaft 21a, and the brake 27 is released so that the shaft 22a can rotate. When the motor 25 is run in this condition such that the driving sprocket 21 turns in its forward direction as shown by arrow K1 in FIG. 10A, rotational motion of the shaft 21a transmitted through the gear 28*a* and gear 28*b* causes the secondary sprocket 22 to rotate in the direction of arrow K2 shown in FIG. 10A. When the chain CA is turned in its forward direction as shown by arrows K3 in FIG. 10A, the upper and lower rotary members 31 turn in synchronism with each other in their forward directions as shown by arrows K4 in FIG. 10A. On the contrary, when the upper and lower rotary members 31 are to be turned in their reverse directions, the driving sprocket 21 and the secondary sprocket 22 should be rotated in their reverse directions by switching the turning direction of the motor 25.

When it is desired to increase the distance between the upper and lower rotary members 31, on the other hand, the sub-brake 35 is released to allow the chain 35 to turn in either direction, the clutch 26 is released to disengage the gear 28*a* from the shaft 21*a*, and the brake 27 is actuated to lock the secondary sprocket 22 on the shaft 22*a*. When the motor 25 is run in this condition such that the driving sprocket 21 turns in its forward direction as shown by arrow K1 in FIG. 10B, the driving sprocket 21 takes up the chain CA from the upper driven sprocket 23 and passes it out to the lower drive sprocket 23 as shown by arrows K3 in FIG. 10B. As a consequence, the extension of the chain CA from the driving sprocket 21 up to the secondary sprocket 22 by way of the peer driven sprocket 23 is reduced while the extension of the chain CA from the driving sprocket 21 up to the secondary sprocket 22 by way of the lower driven sprocket 23 is increased, so that the upper rotary member 31 is raised and the lower rotary member 31 is caused to descend.

Also, the chain 35 turns in the direction of arrow K6 shown in FIG. 10B at the same time, lifting up the bearing block 33 of the upper rotary member 31 and lowering the bearing block 33 of the lower rotary member 31, so that the upper and lower rotary members 31 move upward and downward, respectively, by the same amounts as the upper and lower driven sprockets 23 are moved. When it is desired to decrease the distance between the upper and lower rotary members 31, the motor 25 should simply be run in its reverse direction.

The rotary members 31 shown in FIGS. 9, 10A and 10B may be rotary brushes of an automated vehicle washing machine, for example. In this case, the invention serves to reduce the physical size of a brush mechanism of the washing machine.

Although the connecting pins 13 are rotatably fit in the pin-fitting holes 12*b* in the respective connecting studs 12 in the foregoing embodiment of the invention and its variations illustrated in FIGS. 1–3, 4A–4B, 5, 6 and 7A–7B, the connecting pins 13 may be rotatably fit in the pin-fitting holes 11*a* in the respective link plates 11. Furthermore, each connecting stud 12 may be made of sintered metal impregnated with lubricating oil, or may be rotatably connected to the relevant link plates 11. In the practical application shown in FIG. 9, it is possible to eliminate the clutch 26 and the gears 28*a*, 28*b*. Also in FIG. 9, the two rotary members 31 may be arranged in a common horizontal plane instead of installing them in a common vertical plane.

Moreover, the driving chain CA of FIG. 9 may be replaced by a different type of chain whose successive link units can bend in two directions. Alternatively, a round belt or a wire may be used instead of the driving chain CA of FIG. 9.

Summing up the invention described in the foregoing paragraphs, a chain according to this invention comprises a plurality of link units, each link unit including a pair of link plates and a connection member placed between the link plates at one end of each link unit, wherein the link plates of one link unit are connected end to end with the link plates of another link unit by a connecting pin in such a way that the link units are angularly displaced by 90 degrees from one link unit to another as viewed along an extending direction of the chain, whereby the successive link units of the chain can be alternately bent in two different directions.

Since the multiple link units of this chain are connected by the connection members and the connecting pins projecting outward through the link plates with an angular displacement of 90 degrees from one link unit to another, the successive link units can be alternately bent about the connection members and the connecting pins in two different directions (e.g., horizontally and vertically). Therefore, the chain can be bent and run in desired directions with three-dimensional flexibility, making it possible to mount the chain on a driving sprocket and a driven sprocket placed in arbitrary relative positions. Each sprocket used with this chain should be formed into a bobbinlike structure including a pair of flanges on both sides, each flange having a plurality of engagement recesses made on its outer periphery with which both terminal portions of each connecting pin are meshed.

In the aforementioned chain, each of the connection members may have a pin-fitting hole through which the connecting pin is inserted, and the pin-fitting hole made in each connection member may have an elongated cross-sectional shape whose long axis is oriented in a longitudinal direction of the link plates.

When the pin-fitting hole is made in each connection member, the successive link units can be bendably connected by passing the connecting pins through the pin-fitting holes in the respective connection members. The connecting pins may be rotatably fit in the pin-fitting holes in the connection members or rotatably fit in pin-fitting hole made in the link plates.

If the pin-fitting hole in each connection member is formed to have an elongated cross-sectional shape as stated above, each connecting pin is allowed to tilt, or swing, within the pin-fitting hole in a plane intersecting the connection member at right angles to its longitudinal axis. According to this construction, even if the connection member of each link unit placed between the two link plates is not rotatable relative to the link plates, each link unit can be slightly bent about the longitudinal axis of the connection member of the adjacent link unit.

In the aforementioned chain, the connecting pin may be formed as an integral part of the connection member. In this construction, the connection member serves not only to join two link plates together to assemble each link unit but also to connect the successive link units. This helps to reduce the number of components.

According to the invention, each engagement roller may be mounted on both terminal portions of each connecting pin which project outward through the link plates. In this construction, individual engagement rollers rest in the engagement recesses formed on the flanges of each sprocket so that frictional wear of the chain would be reduced. The engagement rollers are to be mounted rotatably on the individual connecting pins by means of needle bearings or metal bushings, for example.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A chain comprising:
   a plurality of link units interconnected with one another, each link unit including:
   a pair of link plates each having a first end and a second end located at an opposite position from the first end; and
   a connection member having a main body, a first pair of projections extending from said main body in opposite directions along a first axis, and a second pair of projections extending from said main body in opposite directions along a second axis that perpendicularly intersects the first axis;
   said first pair of projections of said connection member of one said link unit supporting the first ends of said link plates of the one said link unit, respectively, in such a manner that said main body and said link plates are rotatable relative to each other about the first axis, said second pair of projections of said connection member of the one said link unit supporting the second ends of said link plates of another said link unit, respectively, in such a manner that said main body and said link plates of the another said link unit are rotatable relative to each other about the second axis, and wherein the another said link unit having the first pair of projections extending parallel to the second axis and the second pair of projections extending parallel to the first axis and wherein each link unit is disposed adjacent to the another said link unit to form the chain;
   wherein said main body of said connection member is formed with a hole, and holds a connecting pin in said hole so as to define said first pair of projections on the opposite ends of said connecting pin; and
   wherein said main body of a connection member has substantially a cylindrical shape having a cylindrical portion and opposite end surfaces and a hole extends through said cylindrical portion in a direction substantially orthogonal to a longitudinal center line extending through said end surfaces.

2. A chain according to claim 1, wherein said second pair of projections are cylindrical and are provided on said end surfaces.

3. A chain according to claim 2, wherein said first and second ends of said link member each have a circular opening and said cylindrical projection pierced said circular opening.

4. A chain according to claim 3, wherein said connecting pin extends through said pin-fitting hole of said connection member when assembled in said chain.

5. A chain according to claim 1, further comprising an engaging roller mounted on the opposite ends of the connecting pin, the engaging roller coming into contact with a sprocket.

6. A chain according to claim 5, further comprising a stopper ring that locks said engaging roller onto said projection.

7. A chain according to claim 1, wherein said link plate is rotatable around said first and second pairs of projections.

8. A chain according to claim 1, wherein said main body and said second pair of projections are formed into one piece.

9. A chain according to claim 1, wherein said connecting pin and said link plate are fixedly connected with each other, and said connecting pin is rotatable in the hole with respect to said main body of said connection member.

10. A chain comprising:
    a plurality of link units interconnected with one another, each link unit including:
    a pair of link plates each having a first end and a second end located at an opposite position from the first end; and
    a connection member having a main body, a first pair of projections extending from said main body in opposite directions along a first axis, and a second pair of projections extending from said main body in opposite directions along a second axis that perpendicularly intersects the first axis;
    said first pair of projections of said connection member of one said link unit supporting the first ends of said link plates of the one said link unit, respectively, in such a manner that said main body and said link plates are rotatable relative to each other about the first axis, said second pair of projections of said connection member of the one said link unit supporting the second ends of said link plates of another said link unit, respectively, in such a manner that said main body and said link plates of the another said link unit are rotatable relative to each other about the second axis, and wherein the another said link unit having the first pair of projections extending parallel to the second axis and the second pair of projections extending parallel to the first axis and wherein each link unit is disposed adjacent to the another said link unit to form the chain;
    wherein said main body of said connection member is formed with a hole, and holds a connecting pin in said hole so as to define said first pair of projections on the opposite ends of said connecting pin; and
    wherein said hole has an elongated cross sectional shape so as to have a longer dimension in a longitudinal direction of said link plate.

11. A chain and sprocket combination, said chain comprising:
    a pair of link plates each having a first end and a second end located at an opposite position from the first end; and
    a connection member having a main body, a first pair of projections extending from said main body in opposite directions along a first axis, and a second pair of projections extending from said main body in opposite directions along a second axis that perpendicularly intersects the first axis;
    said first pair of projections of said connection member of one said link unit supporting the first ends of said link plates of the one said link unit, respectively, in such a manner that said main body and said link plates are rotatable relative to each other about an axis of said first pair of projections, and said second pair of projections of said connection member of the one said link unit supporting the second ends of said link plates of another said link unit, respectively, in such a manner that said main body and said link plates of the another said link unit are rotatable relative to each other about an axis of said second pair of projections; and
    said sprocket comprising a pair of flanges on both sides, each of said flanges having a plurality of engagement recesses formed on an outer periphery of said flanges; and
    wherein at least one of said first and second pairs of projections are structured and arranged to be disposed in at least one of said engagement recesses in said flanges of said sprocket.

12. A chain and sprocket combination according to claim 11, wherein said main body of said connection member is formed with a hole, and holds a connecting pin in said hole so as to define said first pair of projections on the opposite ends of said connecting pin.

13. A chain and sprocket combination according to claim 12, wherein said hole has an elongated cross sectional shape so as to have a longer dimension in a longitudinal direction of said link plate.

14. A chain and sprocket combination according to claim 12, wherein said main body of said connection member has substantially a cylindrical shape having a cylindrical portion and opposite end surfaces and said hole extends through said cylindrical portion in a direction substantially orthogonal to a longitudinal center line extending through said end surfaces.

15. A chain and sprocket combination according to claim 14, wherein said second pair of projections are cylindrical and are provided on said end surfaces.

16. A chain and sprocket combination according to claim 15, wherein said first and second ends of said link member each have a circular opening and said cylindrical projection pierced said circular opening.

17. A chain and sprocket combination according to claim 16, wherein said connecting pin extends through said pin-fitting hole of said connection member when assembled in said chain.

18. A chain and sprocket combination according to claim 12, further comprising an engaging roller mounted on the opposite ends of the connecting pin, the engaging roller coming into contact with the sprocket.

19. A chain and sprocket combination according to claim 18, further comprising a stopper ring that locks an engagement state of said engaging roller onto said projection.

20. A chain and sprocket combination according to claim 12, wherein said main body and said second pair of projections are formed into one piece.

21. A chain and sprocket combination according to claim 12, wherein said connecting pin and said link plate are fixedly connected with each other, and said connecting pin is rotatable in the hole with respect to said main body of said connection member.

22. A chain and sprocket combination according to claim 11, wherein said link plate is rotatable around said first and second pairs of projections.

23. A chain and sprocket combination according to claim 11, wherein said main body, said first and second pairs of projections are formed into one-piece.

* * * * *